US011430055B2

(12) United States Patent
Deagan et al.

(10) Patent No.: US 11,430,055 B2
(45) Date of Patent: *Aug. 30, 2022

(54) BID OPTIMIZATION

(71) Applicant: Toast AI, LLC, Calabasas, CA (US)

(72) Inventors: Brian Patrick Deagan, Akron, OH (US); William Patrick Landers, Akron, OH (US); Matthew Edward Liszewski, Uniontown, OH (US); Daniel Robert Spohn, Hudson, OH (US)

(73) Assignee: TOAST AI LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,644

(22) Filed: Dec. 10, 2020

(65) Prior Publication Data

US 2021/0097601 A1 Apr. 1, 2021

Related U.S. Application Data

(63) Continuation of application No. 15/685,345, filed on Aug. 24, 2017, now Pat. No. 10,867,348.

(51) Int. Cl.
*G06Q 30/08* (2012.01)
*G06Q 30/02* (2012.01)

(52) U.S. Cl.
CPC ......... *G06Q 30/08* (2013.01); *G06Q 30/0283* (2013.01)

(58) Field of Classification Search
USPC ...................................................... 705/14.71
See application file for complete search history.

(56) References Cited

U.S. PATENT DOCUMENTS

| | | | |
|---|---|---|---|
| 2005/0144065 A1* | 6/2005 | Calabria | G06Q 30/08 705/37 |
| 2006/0136325 A1* | 6/2006 | Barry | G06Q 10/087 705/37 |

(Continued)

OTHER PUBLICATIONS

Real Time Bid Optimization with Smooth Budget Delivery in Online Advertising (Year: 2013).*

(Continued)

*Primary Examiner* — Gautam Ubale
(74) *Attorney, Agent, or Firm* — Cooper Legal Group LLC

(57) ABSTRACT

One or more techniques and/or systems are provided for bid optimization. A bid test component is configured to receive a notification from a content recommendation auction engine that a user has requested that the bid test component test various bidding parameters for a content scheme used to bid on opportunities to show content to users. Accordingly, a set of test content schemes are created. Varying bid levels, budget allocations, and/or other bidding parameters are set for the test content schemes. The test content schemes are submitted to the content recommendation auction engine for bidding on opportunities to show content. Test content scheme statistics, regarding the performance of the test content schemes, are collected. Recommendations are providing and automated content scheme management is facilitated based upon the test content scheme statistics.

20 Claims, 9 Drawing Sheets

(56) References Cited

U.S. PATENT DOCUMENTS

| | | | | |
|---|---|---|---|---|
| 2010/0250332 | A1* | 9/2010 | Ghosh | G06Q 30/02 |
| | | | | 705/26.1 |
| 2012/0041816 | A1* | 2/2012 | Buchalter | G06Q 30/02 |
| | | | | 705/14.71 |
| 2012/0246020 | A1* | 9/2012 | Kersten | G06Q 30/0611 |
| | | | | 705/26.3 |
| 2012/0310729 | A1* | 12/2012 | Daito | G06Q 30/0241 |
| | | | | 705/14.43 |
| 2013/0159110 | A1* | 6/2013 | Rajaram | G06Q 50/01 |
| | | | | 705/14.66 |
| 2014/0278981 | A1* | 9/2014 | Mersov | G06Q 30/0255 |
| | | | | 705/14.53 |
| 2015/0363835 | A1* | 12/2015 | Khan | G06Q 30/0275 |
| | | | | 705/14.71 |
| 2019/0066200 | A1* | 2/2019 | Deagan | G06Q 30/0283 |
| 2019/0068733 | A1* | 2/2019 | Lewis | G06N 7/005 |
| 2019/0205900 | A1* | 7/2019 | Buchalter | G06Q 30/0242 |

OTHER PUBLICATIONS

Sponsored Search Auction considering Combinational Bids with Externalities (Year: 2015).*

Optimal budget allocation strategies for real time bidding in display advertising (Year: 2015).*

A Method and System for Evaluating Effectiveness of a Demand Side Platform (Year: 2017).*

* cited by examiner

BID OPTIMIZATION

RELATED APPLICATIONS

This application claims priority to and is a continuation of U.S. application Ser. No. 15/685,345, filed on Aug. 24, 2017, now allowed, titled "BID OPTIMIZATION," which is incorporated herein by reference.

BACKGROUND

Many entities, such as businesses, spend substantial amounts of computing resources and network bandwidth for generating content that is provided to users. In an example, a wildlife foundation may distribute newsletters to users through emails. In another example, a videogame club may display videogame imagery and videos through various websites, applications, social network feeds, etc. In this way, entities may share content with users through various mediums, such as text message, websites, social networks, mobile apps, etc.

DETAILED DESCRIPTION

Figure 1:
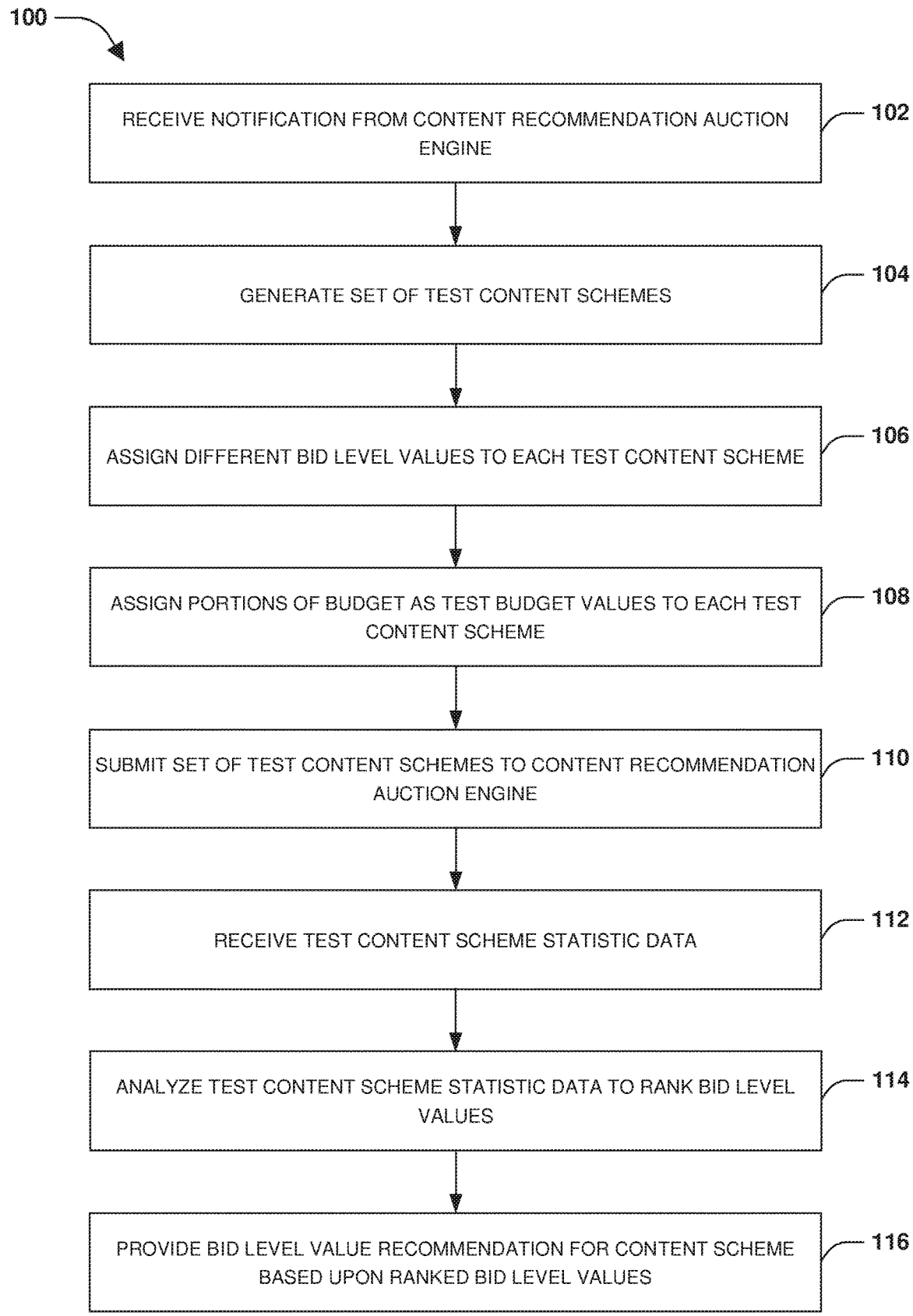
FIG. 1 is a flow diagram illustrating an exemplary method of bid optimization.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

An entity, such as a user or business, may spent a substantial amount of time and computing resources in generating and providing relevant content to users, such as newsletters, photos, text, links to websites, the ability to purchase consumer goods, videos, etc. The entity may display such content through a content provider service, such as an application, a videogame console user interface, a videogame interface, a mobile app, augmented reality, a website, a social network, an email provider, a messaging interface, etc. The content provider service may be associated with a content recommendation auction engine. The content recommendation auction engine may provide an interface through which entities can submit bids at certain bid levels for attempting to win opportunities to recommend, such as display, content to users of the content service provider. Unfortunately, the content recommendation auction engine may provide inadequate advice and recommendations regarding how to bid on opportunities to recommend/display content. Thus, time and computing resources may be wasted on missed opportunities to show users relevant content or in showing users irrelevant content. The entity may waste substantial amounts of time and computing resources (e.g., processing resources, network bandwidth, etc.) in a manual effort to monitor and adjust bidding parameters in order to efficiently utilize a budget (e.g., avoiding overbidding on opportunities that do not result in actions by users; avoiding losing opportunities due to low bidding; etc.) while achieving goals (e.g., achieving a desired amount of actions by users such as purchasing a consumer good), which can be error prone and imprecise.

Accordingly, as provided herein, bid optimization is provided in order to reduce time and computing resources otherwise wasted in bidding on missed opportunities to display relevant content to users (e.g., submitting bids at a bid level that will not win opportunities to show content to users that may be interested in such content) or in providing irrelevant content to users (e.g., wasting network bandwidth to display men's winter clothing recommendations for a teenage girl that lives in Mexico). In an example, a bid test component is configured to test various bid conditions and/or bidding parameters in order to identify optimal performing bidding parameters, such as a bid level value (e.g., an amount of money to bid on an opportunity to recommend/display content).

The bid test component may automatically manage test content schemes, for a user in an automated manner, in place of an initial content scheme defined by the user. The bid test component may automatically adjust budgets for test content schemes (e.g., increase budgets for better performing test content schemes), deactivate poor performing test content schemes, create new test content schemes for further testing, adjust bid levels and budgets at various times (e.g., increase budget on Mondays; decrease budget from 2:00 pm until 9:00 am on Tuesdays; increase bid levels on weekends and during a summer season; etc.). In this way, the bid test component eliminates the guess work by humans that otherwise leads to errors, wasted time, guess work, and/or wasted computing resource utilization used to manually monitor and adjust bidding parameters.

Figure 2:
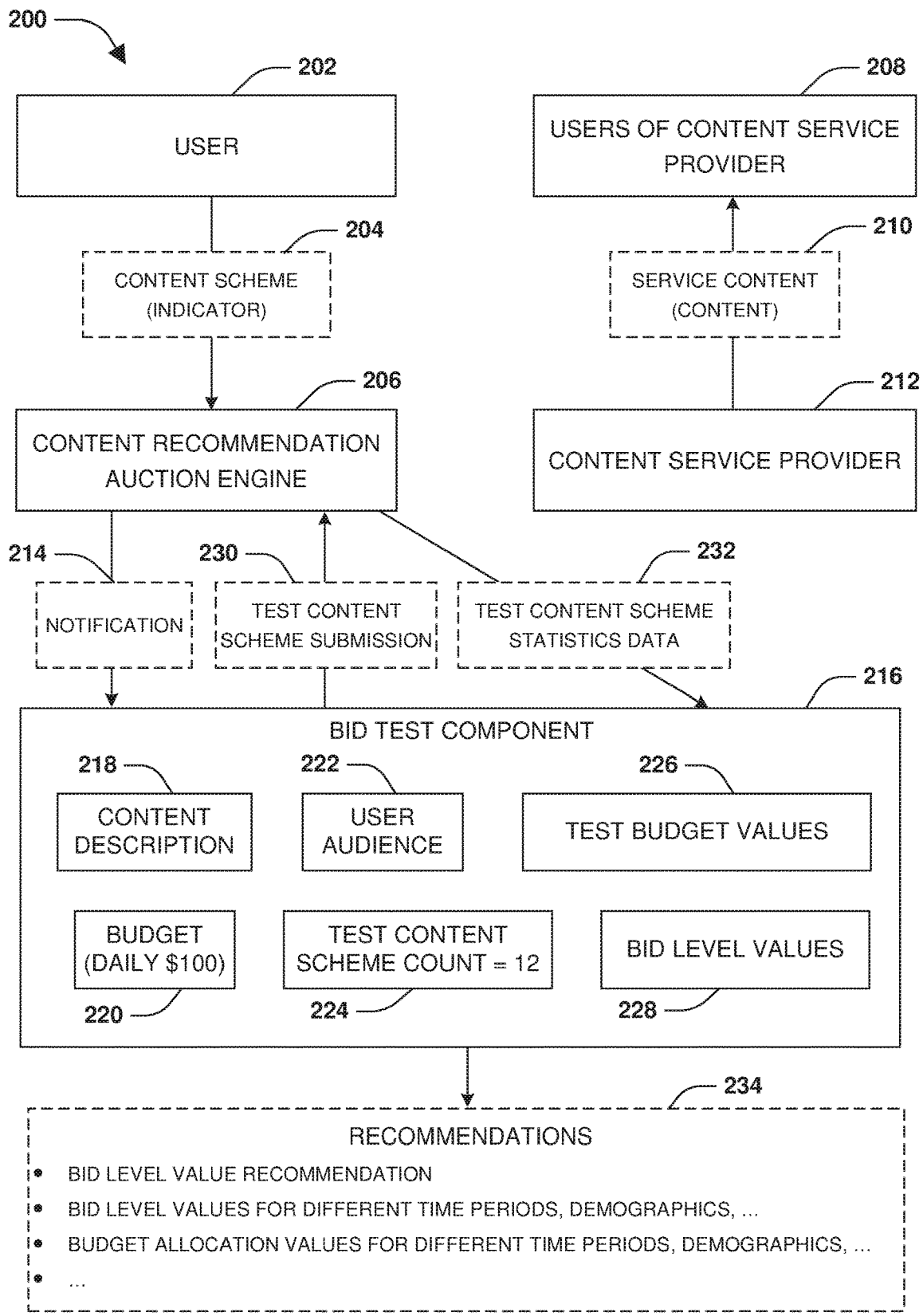
FIG. 2 is a component block diagram illustrating an exemplary system for of bid optimization.

An embodiment of bid optimization is illustrated by an exemplary method 100 of FIG. 1, which is described in conjunction with an exemplary system 200 of FIG. 2 for bid optimization by a bid test component 216. A user 202, such as a bike shop, may desire to show bike content (e.g., videos, images, text, links to a website, audio snippets, etc.) to users of a content provider service 212, such as social network users of a social network. A content recommendation auction engine 206 may host an auction through which various users can submit bids for the ability to show content to users 208 of the content social network. For example, a highest bid on an opportunity to display content to a particular user may be chosen as a winner, and thus corresponding content may be displayed to that user. In this way, users may create content schemes used to bid on such opportunities. Unfortunately, selecting a bid level that will win opportunities while effectively and efficiently utilizing a budget of the content scheme (e.g., a single high winning bid that uses a substantial amount of the budget may be inefficient while a lot of low losing bids are ineffective) may be very difficult to determine.

Accordingly, at 102, a notification 214 may be received by the bid test component 216 from the content recommendation auction engine 206. The notification 214 may indicate that the user 202 has specified an indicator for a content scheme 204 used to facilitate bidding on opportunities through the content recommendation auction engine 206 to recommend content of the content scheme to users 208 of the content provider service 212 (e.g., opportunities to display bike content within service content 210 of the content service provider such as a bike photo displayed within a social network feed of the social network). In an example, the indicator may be specified by the user 202 through the content recommendation auction engine 206 when creating the content scheme, such as a keyword or phrase inserted into a name of the content scheme (e.g., the inclusion of the keyword "bidtest" or any other indicator into a name of the content scheme). In one example, inclusion of the indicator within the content scheme 204 may trigger the content recommendation auction engine 206 to access an application programming interface (API) of the bid test component 216 for sending the notification 214 to the bid test component 216, such as over a network. In another example, the bid test component 216 polls the content recommendation auction engine 206 (e.g., a repository of the content recommendation auction engine 206) to recognize command/trigger keywords such as the indicator known to the bit test component 216.

The notification 214 may comprise a content description 218 of content of the content scheme (e.g., a description of bike promotional content), a user audience 222 targeted by the content scheme (e.g., bikers), a daily budget 220 (e.g., an allocation of $100 per day for bidding on opportunities to show content to users 208). In an example, the notification 214 may comprise a recommended bid level range suggested by the content recommendation auction engine 206 for the content scheme (e.g., a bid range of between $5.20 and $11.30). In another example, the notification 214 may comprise a recommended bid level value suggested by the content recommendation auction engine 206 for the content scheme (e.g., a bid of $6.00). Because the recommended bid level range and/or the recommended bid level value may result ineffective and/or inefficient outcomes (e.g., bidding at $6.00 may result in small number of winning bids because the value may be too low to win most opportunities, and thus users are not being shown content of the content scheme), the bid test component 216 is configured to create and implement test content schemes in order to identify recommended bid level values and/or other bidding parameters.

At 104, a set of test content schemes may be generated by the bid test component 216 based upon the content scheme 204 such as based upon information within the notification 214. In an example, the description of the content 218, the user audience 222, the budget 220, and/or historic content scheme performance data (e.g., conversion rates, click through rates, user action rates, bid winning rates, budget spending velocity, and/or a wide variety of statistics of how the content scheme has historically performed or how other similar content schemes have performed, such as content schemes with a similar target audiences, similar content, similar budget, etc.) may be used to determine a number 224 of test content schemes to create, such as 12 test content schemes.

At 106, different bid level values 228 (e.g., an amount of money to bid on opportunities) may be assigned by the bid test component 216 for each test content scheme. In an example, a bid level value may be based upon the description of the content 218, the user audience 222, the budget 220, and/or the historic content scheme performance data. In another example, a bid level value may be determined based upon the recommended bid level range (e.g., the bid level values 228 may be defined as values within the recommended bid level range such as values ranging from $5.20 to $11.30 or within a threshold outside of the recommended bid level range such as values ranging from $4.20 to $12.30). In another example, a bid level value may be determined based upon the recommended bid level value, such as a bid level value of $6.00.

At 108, portions of the budget 220 may be assigned by the bid test component 216 as test budget values 226 to each test content scheme. In an example, the budget 220 may be divided evenly amongst the test content schemes. In another example, the budget 220 may be divided in different amounts to the test content schemes, such as where a larger portion of the budget may be allocated to a test content scheme predicted to perform better than other test content schemes (e.g., a prediction based upon the description of the content 218, the user audience 222, the budget 220, the recommended bid level range, the recommended bid level value, and/or the historic content scheme performance data). The test budget values 226 may be determined based upon the description of the content 218, the user audience 222, the budget 220, the recommended bid level range, the recommended bid level value, and/or the historic content scheme performance data. In an example, a budget reserve amount may be determined for the budget 220 (e.g., a reserve amount of $20 of the $100 budget 220). The test budget values 226 may total a difference between the budget 220 and the budget reserve amount (e.g., $80 may be dispersed amongst the test content schemes). The budget reserve amount may be used to subsequently change, such as increase, test budget values 226 during implementation of the test content schemes.

At 110, the 12 test content schemes may be submitted 230 by the bid test component 216 to the content recommendation auction engine 206 for bidding on opportunities through the content recommendation auction engine 206 to recommend content to the users 208 of the content service provider 212 (e.g., display, through a social network feed, a link to a biking website to purchase a bike). In this way, the content recommendation auction engine 206 implements the 12 test content schemes for live bidding on opportunities to display content.

At 112, the bid test component 216 may receive test content scheme statistic data 232 from the content recommendation auction engine 206. The test content scheme statistic data 232 may comprise a wide variety of statistical data, such as an amount of test budget spent by a certain amount of time by a test content scheme, a velocity of how fast the test budget is being spent, a conversion rate of users purchasing the bike, a user action of users clicking the link, a user action of users adding the bike to a shopping cart, an amount of won or lost bids by the test content scheme, etc. In an example, external data that could influence performance and demand may be retrieved from various data sources and services (e.g., calendar data, a website, weather data, local event data from a local event app, traffic data, time of day data, GPS data, etc.). For example, importing U.S. Holiday data would assist predictions of high demand periods.

At 114, the bid test component 216 may utilize various analysis techniques, parameters, thresholds, statistical models, and/or other rules or functions to evaluate the test content scheme statistic data 232 to rank the bid level values 228 assigned to the test content schemes. For example, an analysis rule may assign higher ranks to a first set of test content schemes that spent their budget and had more overall conversions (e.g., bike sales) than a second set of test content schemes that also spent their budget but had less overall conversions because bid level values of the second set of test content schemes were too high for efficient budget utilization (e.g., too many high winning bids that spent the budget without an adequate number of overall winning bids that would have led to more potential conversions). In another example, an analysis rule may assign higher ranks to a first set of test content schemes that spent their budget and resulted in user action than a second set of test content schemes that spent little of their budget because bid level values of the second set of test content schemes were too low to win opportunities to show content.

In an example, a test content scheme may be terminated based upon monitored test content scheme statistic data for the content scheme and/or a rank of the test content scheme (e.g., low ranking and thus low performing test content schemes may be terminated). In another example, a bid level value of a test content scheme may be adjusted based upon monitored test content scheme statistic data for the content scheme and/or a rank of the test content scheme (e.g., the bid level value may be increased if the test content scheme does not appear to be wining many opportunities because the bid level value was too low). In another example, a test budget value of a test content scheme may be adjusted based upon monitored test content scheme statistic data for the content scheme and/or a rank of the test content scheme (e.g., high ranking and thus high performing test content schemes may be allocated more budget).

At 116, one or more recommendations 234 for the content scheme may be provided by the bid test component 216 based upon the ranked bid level values. For example, a bid level recommendation may be provided to the user 202 (e.g., a bid level value of $7.43 that outperformed other bid level values). In an example, a first bid level value (e.g., $4.00) may be recommended for a first time period (e.g., Monday and Thursday; from 3:00 pm until 7:00 pm during the week; April 15th until May 30th; etc.). A second bid level value (e.g., $9.00) may be recommended for a second time period (e.g., Tuesday, Wednesday, Friday, Saturday, and Sunday because the test content scheme statistics data 232 indicates that higher bids on such days provide more efficient results such as more winning bids and conversions without unnecessarily wasting budget).

In another example, a first budget allocation may be recommended for a first time period (e.g., a daily allocation of $50 for January through April). A second budget allocation may be recommended for a second time period (e.g., a daily allocation of $200 for May through August because the test content scheme statistics data 232 indicates that more users are interested in bikes during such months).

In another example, bid level values and/or budget allocations may be recommended based upon demographics of the user audience (e.g., age, career, income, user characteristics identifiable from social network data such as posts about being a sports enthusiast, purchase history, user location identifiable from global position system (GPS) data of a user device, residency, etc.). For example, a higher budget and/or higher bid level values may be allocated when bidding on opportunities to display content targeted to residents that live in cities with high costs of living and high incomes.

In another example, a recommendation may be provided to allocate a first portion of the budget for use in an automatic bidding option provided by the content recommendation auction engine 206 where the content recommendation auction engine 206 automatically adjusts bid levels of the content scheme. A second portion of the budget and a bid level value for use in a manually bidding option provided by the content recommendation auction engine 206 may be recommended (e.g., the user 202 can manually or the bid test component 216 can automatically set the bid level value and the budget for the content scheme).

In another example, an estimated budget utilization (EBU) may be determined based upon the test content scheme statistics data 232. The estimated budget utilization specifies an amount of a test budget value, allocated to a test content scheme, which will be used by a point in time (e.g., a percentage of a $50 budget, allocated to a test content scheme that will be used by end-of-day midnight). The estimated budget utilization may be provided as feedback to the user 202. The estimated budget utilization may be determined based upon a velocity of budget utilization from a first point in time to a second point in time (e.g., a velocity of budget spend of the $50 from the start of day up to a current time).

In another example, a performance of a test content scheme (e.g., a rank comprising a numerical rank such as from 0-10, a letter rank such as from A-F, or any other ranking scheme) may be determined based upon the monitored content scheme statistics 232. Responsive to the performance being below a first threshold (e.g., a low performing test content scheme having a rank of 3 or less), a first indicator may be sent to the content recommendation auction engine 206 to display to the user (e.g., a thumbs down icon or any other visual indicator such as text, characters, an image, a number, audio, a video snippet, etc. that can be provided, such as displayed inline, with information provided by the content recommendation auction engine 206 to the user 202 through a content recommendation auction engine interface). Responsive to the performance being between the first threshold and a second threshold (e.g., a medium performing test content scheme having a rank between 4 and 7), a second indicator may be sent to the content recommendation auction engine to display to the user (e.g., a sideways thumb icon). Responsive to the performance being greater than the second threshold (e.g., a high performing test content scheme having a rank over 7), a third indicator may be sent to the content recommendation auction engine to display to the user (e.g., a thumbs up icon).

In an example, a recommendation is applied, such as to change a bid level value, a budget allocation, etc. Applying recommendations over time becomes a feedback loop where with each loop/change, the bid test component monitors performance, analyzes statistical data, generates recommendations, and applies recommendations.

In one embodiment, fully automated bid management functionality may be provided where the bid test component 216 manages bid levels, budget allocations, and/or other parameters of bidding, such as for a lifetime of a content campaign/scheme of the user 202. For example, an automated bidding scheme may be implemented to generate and submit test content schemes to the content recommendation auction engine 206 in place of the content scheme initially submitted by the user 202. The test content schemes may be adjusted dynamically during implementation by the content recommendation auction engine 206 based upon monitored content scheme statistics for the test content schemes (e.g., poor performing test content schemes may be deleted, high performing test content schemes may be allocated more budget, etc.). Various APIs, communication protocols, and/or functionality may be used to facilitate the communication between the bid test component 216 and the content recommendation auction engine 206.

In an example, the bid test component 216 may be configured to manage overall budget across multiple content schemes. The bid test component 216 may set and refine budget allocations between the different content schemes based upon test content scheme statistic data for the content schemes. In this way, budget may be moved between content schemes (e.g., different campaigns such as a videogame console campaign and a refrigerator campaign for an electronic retailer), such as after determining macro views over bidding/auction. In another example, the bid test component 216 may be configured to manage overall budget across multiple content service providers, such as to set and refine budget allocations used for bidding through a social network service, a news website, a forum website, a mobile game app, etc.

Figure 3:
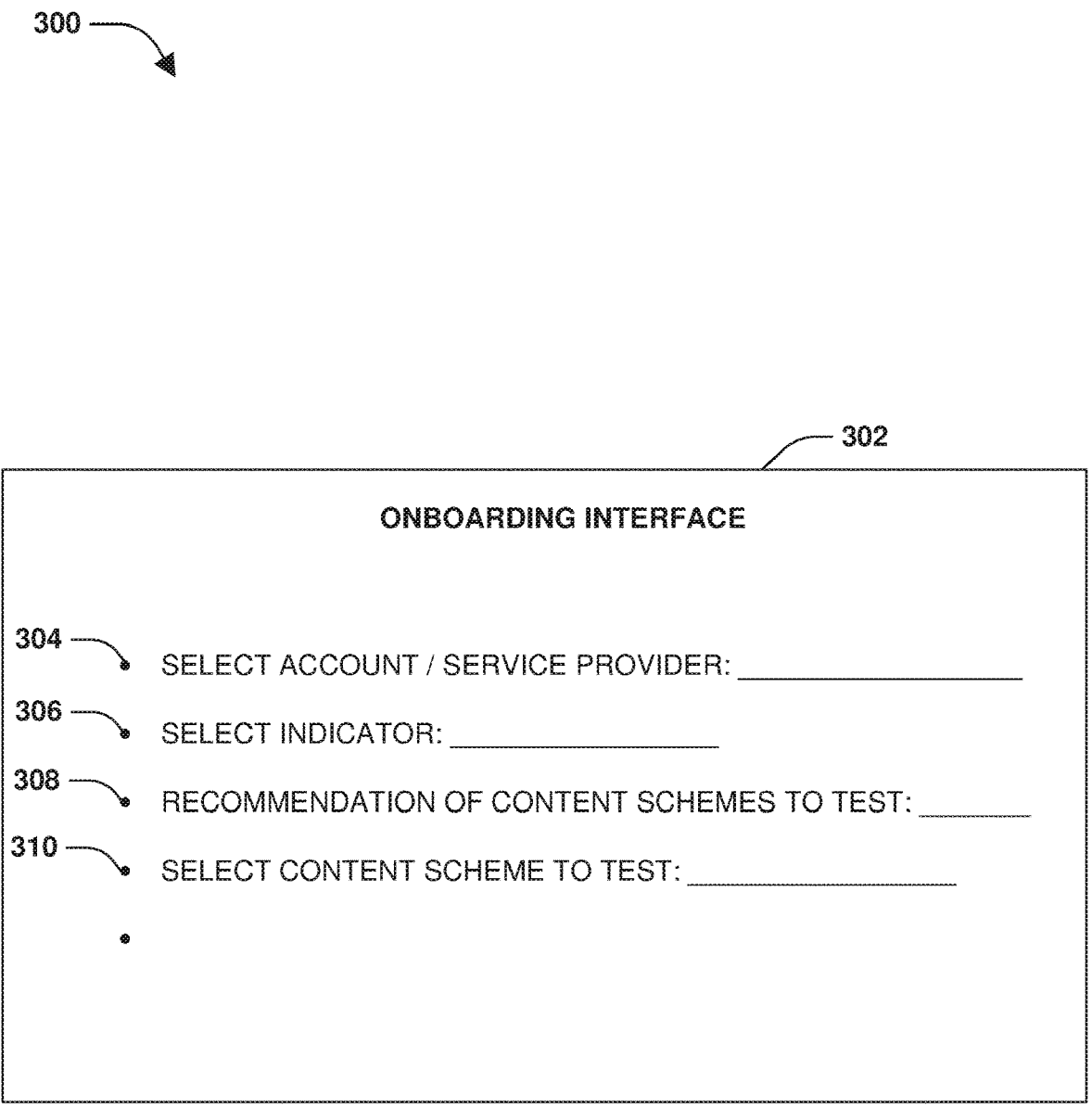
FIG. 3 is a component block diagram illustrating an exemplary system for of bid optimization, where an onboarding interface is provided.

FIG. 3 illustrates a system 300 for bid optimization. A bid test component may display an onboarding interface 302 to a user that wants to participate in bidding through a content recommendation auction engine for opportunities to display content to users of a content provider service associated with the content recommendation auction engine (e.g., a custom tee shirt company may want to display tee shirt photos and links to purchase tee shirts to users of the content provider service, such as users of an application, a videogame, a mobile app, a website, a social network, etc.). The user may input account information 304 that the user has with the content provider service. The user may input or select or be provided with an indicator 306 that the user can associate with a content scheme submitted by the user to the content recommendation auction engine for bidding on opportunities to display content to users. When the content recommendation auction engine determines that the indicator has been associated with the content scheme, the content recommendation auction engine will be triggered to communicate with and accept instructions from the bid test component for implementing test content schemes from the bid test component and providing test content scheme statistic data to the bid test component.

The user may be provided with recommendations 308 of content schemes to test. For example, the bid test component may use the account information 304 to extract content scheme data from the content recommendation auction engine for evaluation to determine the recommendations 308 (e.g., poor performing content schemes may be recommended such as content schemes will bid success below a threshold or content schemes that are inefficiently utilizing budget such as overbidding on opportunities that are not resulting in a total desired amount of conversions for tee shirt purchases). In this way, the user may select 310 one or more content schemes to test.

The onboarding interface 302 is used to guide the user through creating a first test content scheme. The onboarding interface 302 allows the user to authorize the bid content component to interface with the content recommendation auction engine, such as using an application programming interface (API), for the account information 304 such as a selected content scheme. After onboarding, the user may work through their native tools, such as a content recommendation auction engine interface.

Figure 4:
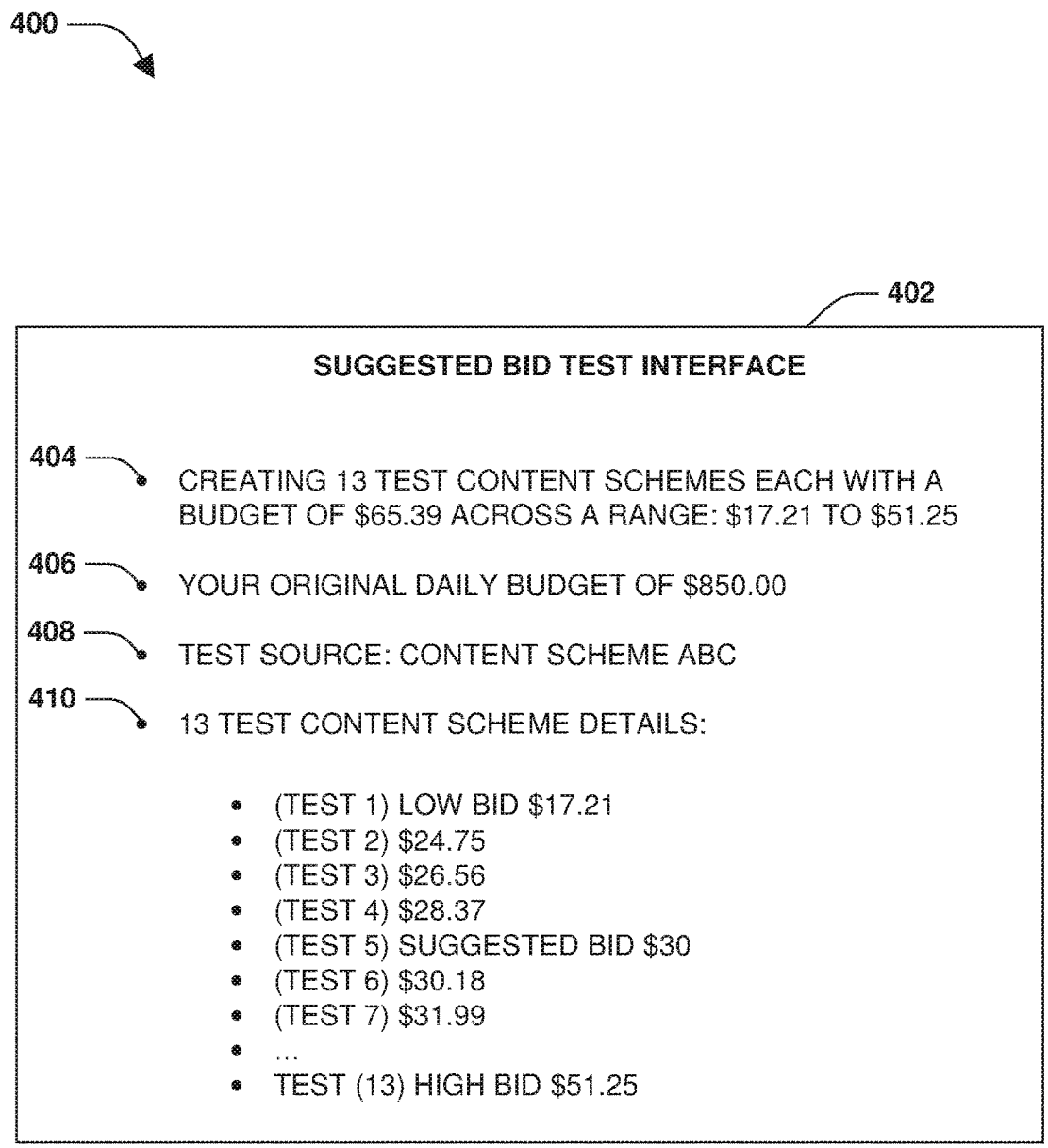
FIG. 4 is a component block diagram illustrating an exemplary system for of bid optimization, where a suggested bid test interface is provided.

FIG. 4 illustrates a system 400 for bid optimization. A bid test component may display a suggested bid test interface 402 to a user that wants to participate in bidding through a content recommendation auction engine for opportunities to display content to users of a content provider service associated with the content recommendation auction engine (e.g., a surfboard shop may want to display surfboard promotional content to users of the content provider service, such as users of an application, a videogame, a mobile app, a website, a social network, etc.).

The bid test component may receive a notification of a content scheme submitted by the user through the content recommendation auction engine. The user may have tagged the content scheme with an indicator "%&&AABB" used to trigger/notify the content recommendation auction engine to send the notification to the bid test component, for example (e.g., a webhook/trigger action sent to the bit test component). The notification may comprise a description of content, a target user audience, and/or a budget of the content scheme. In another example, the content recommendation auction engine (e.g., a repository of the content recommendation auction engine) is polled via an API to detect the preference of the notification (e.g., a command keyword recognized by the bit test component).

The bid test component may populate the suggested bid test interface 402 based upon the notification. For example, the suggested bid test interface 402 may be populated with a suggested number 404 of test content schemes to create, such as 13 test content scheme each with a budget of $65.39 and having bid level values ranging from $17.21 to $51.25. The suggested bid test interface 402 may be populated with the original budget of $850.00 of the content scheme. The suggested bid test interface 402 may be populated with a description of the content scheme, such as a name of the content scheme "content scheme ABC". The suggested bid test interface 402 may be populated with details 410 of the test content schemes, such as bid level values assigned to each test content scheme (e.g., a bid level value of $17.21 for a first test content scheme that corresponding to a low bid value of a recommended bid level range specified by the content recommendation auction engine, a bid level value of $24.75 for a second test content scheme, a bid level value of $26.37 for a third test content scheme, a bid level value of $30 for a fifth test content scheme corresponding to a recommended bid level value specified by the content recommendation auction engine, a bid level value of $51.25 for a thirteenth test content scheme corresponding to a low bid value of a recommended bid level range specified by the content recommendation auction engine, etc.).

In an example, 30 days or any other timespan of data is analyzed to determine optimal content schemes to test. The suggested content schemes to test are content schemes that would benefit from testing, such as poor performing or inefficient content schemes.

Figure 5:
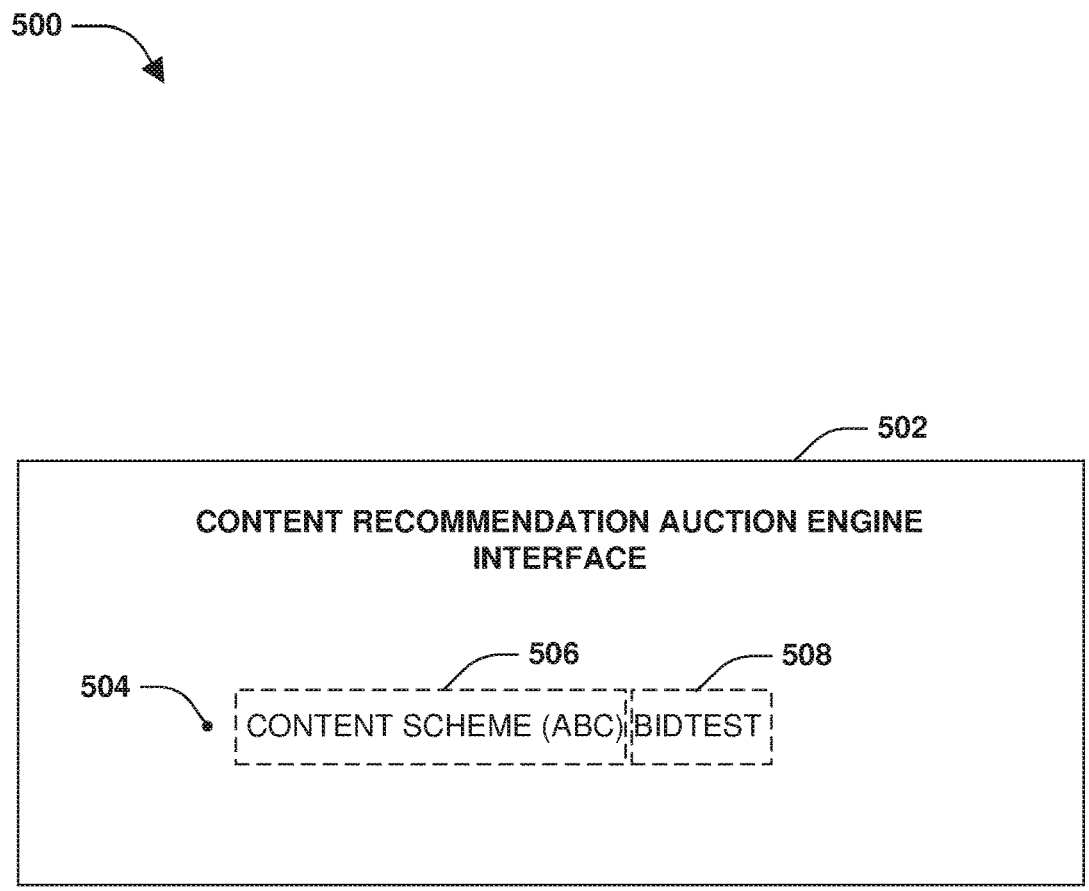
FIG. 5 is a component block diagram illustrating an exemplary system for of bid optimization, where a content recommendation auction engine interface is provided.

FIG. 5 illustrates a system 500 for bid optimization. A user may want to participate in bidding through a content recommendation auction engine for opportunities to display content to users of a content provider service associated with the content recommendation auction engine (e.g., a real estate agency may want to display for sale home photos to users of the content provider service, such as users of an application, a videogame, a mobile app, a website, a social network, etc.). The content recommendation auction engine may display a content recommendation auction engine interface 502 to the user for defining a content scheme used for bidding on such opportunities. In an example, the user may utilize an input interface 504 to specify a "content scheme (ABC)" name 506 for a content scheme. The user may utilize the input interface 504 to specify an indicator "bidtest" 508. The indicator "bidtest" 508 will trigger the content recommendation auction engine to provide a notification of the content scheme to a bid test component.

Figure 6:
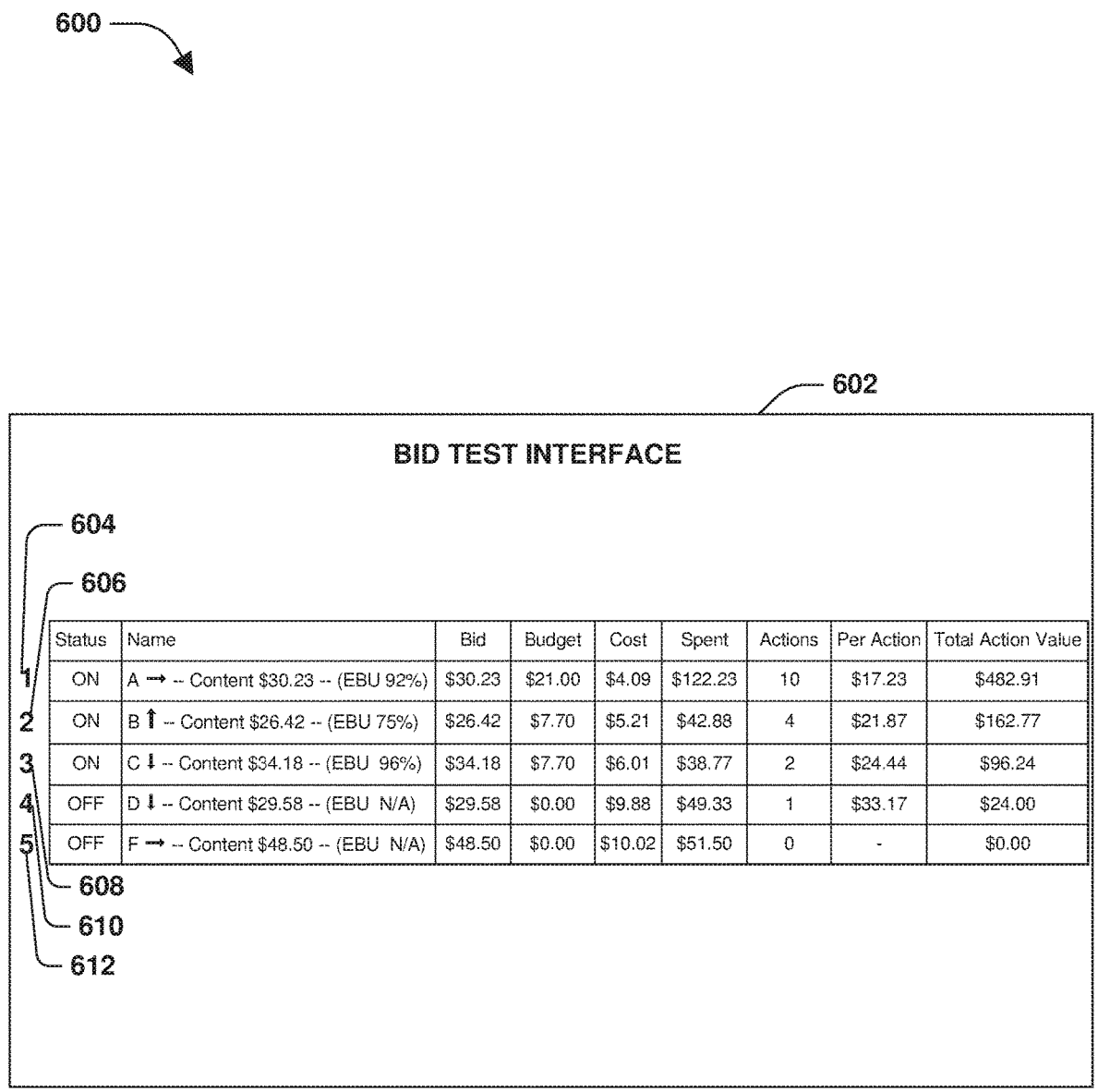
FIG. 6 is a component block diagram illustrating an exemplary system for of bid optimization, where a bid test interface is provided.

FIG. 6 illustrates a system 600 for bid optimization. A bid test component may create test content schemes that are automatically implemented and managed on behalf of a user in place of a content scheme initially created by the user. The bid test component may create a first test content scheme 604, a second test content scheme 606, a third test content scheme 608, a fourth test content scheme 610, a fifth test content scheme 612, and/or other test content schemes based upon the content scheme. Each test content scheme may be assigned different bid level values used to bid on opportunities through a content recommendation auction engine to display content to users of a content provider service, such as a bid level value of $30.23 for the first test content scheme 604 (e.g., the first test content scheme 604 will bid at $30.23 for opportunities to display content), a bid level of $26.42 for the second test content scheme 606, etc. The bid test component may submit the test content schemes to the content recommendation auction engine for implementation for active bidding on opportunities.

The bid test component may receive test content scheme statistic data regarding performance of the test content schemes from the content recommendation auction engine. The bid test component may display a bid test interface 602 to the user. The bid test interface 602 may be populated with information relating to the automated implementation, management, and performance of the test content schemes. For example, the bid test interface 602 may display statuses for the test content schemes (e.g., the bid test component may turn off the fourth test content scheme 610 and the fifth test content scheme 612 due to poor performance). The bid test interface 602 may display a rank, a trend (e.g., a 7 day or any other timespan trend of the rank either increasing, decreasing, or staying the same), a bid level value, and/or an estimated budget utilization for a test content scheme (e.g., the first test content scheme 604 may have an A rank indicative of desired performance, a stable trend illustrated by a sideways arrow, a bid level value of $30.23, and an estimated budget utilization of 92%). The bid test interface 602 may also display a bid level value, a test budget value, a cost, a budget spent so far, a number of actions taken by users for which content of a test content scheme is displayed from a winning bid (e.g., adding an item into a shopping cart, purchasing the item, saving the item for later, sending an email regarding the item, creating a social network post regarding the item, submitting a question through a forum regarding the item, etc.), a cost per action, and/or a total action value.

Figure 7:
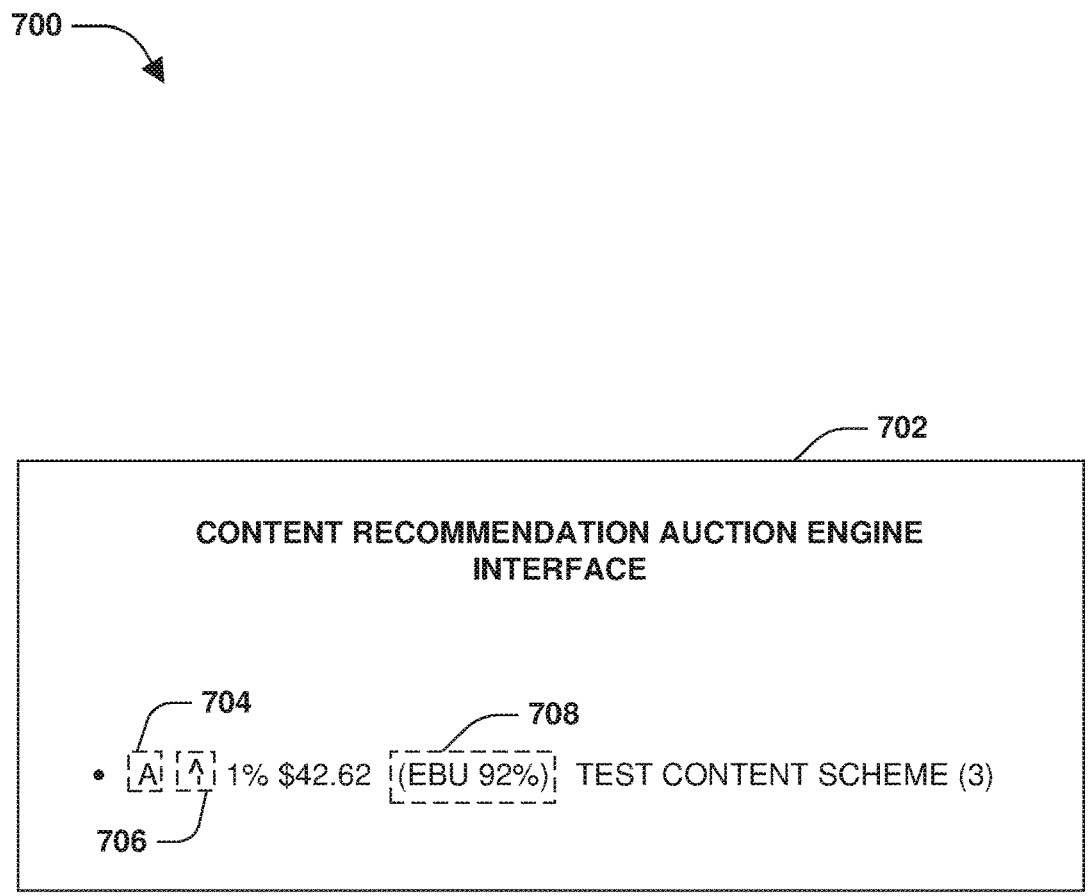
FIG. 7 is a component block diagram illustrating an exemplary system for of bid optimization, where a content recommendation auction engine interface is provided.

FIG. 7 illustrates a system 700 for bid optimization. A content recommendation auction engine may display a recommendation auction engine interface 702 to a user. The user may be associated with one or more test content schemes that were submitted on behalf of the user to the content recommendation auction engine for determining optimal bid level values, budget values, and/or other recommended parameters for bidding on opportunities to show content through a content provider service associated with the content recommendation auction engine. For example, a bid test component may have created and submitted a test content scheme (3) to the content recommendation auction engine for implementation of bidding on opportunities to display content.

The content recommendation auction engine may have provided test content scheme statistic data to the bid test component regarding performance of the test content scheme (3). The bid test component may have assigned a rank 704 to the test content scheme (3) regarding performance of the test content scheme (3) such as a rank of A out of a range of A being a high performer to F being a low performer. The rank of A is an indicator that the user could increase the allocation of budget for the test content scheme (3) because of the high performance of the test content scheme (3) (e.g., the ability to win bids for opportunities to display content that actually lead to conversions/sales using a cost effective amount of available budget for winning such bids). The bid test component may determine a trend 706 of the rank 704, such as an increasing rank/performance trend that is represented by an up arrow (e.g., the rank 704 may have increased from a B rank to the A rank). The bid test component may determine an estimated budget utilization 708 for the test content scheme (3), such as an estimated 92% utilization of the daily budget by an end of day.

The bid test component may provide the rank 704, the trend 706, and/or the estimated budget utilization 708 to the content recommendation auction engine for display through the content recommendation auction engine interface 702. For example, the bid test component, hosted on a first computing device, may send the data over a network to a second computing device hosting the content recommendation auction engine. The data may be formatted according to a data format understood by the content recommendation auction engine. In this way, the content recommendation auction engine can display the data through the content recommendation auction engine interface 702.

Figure 8:
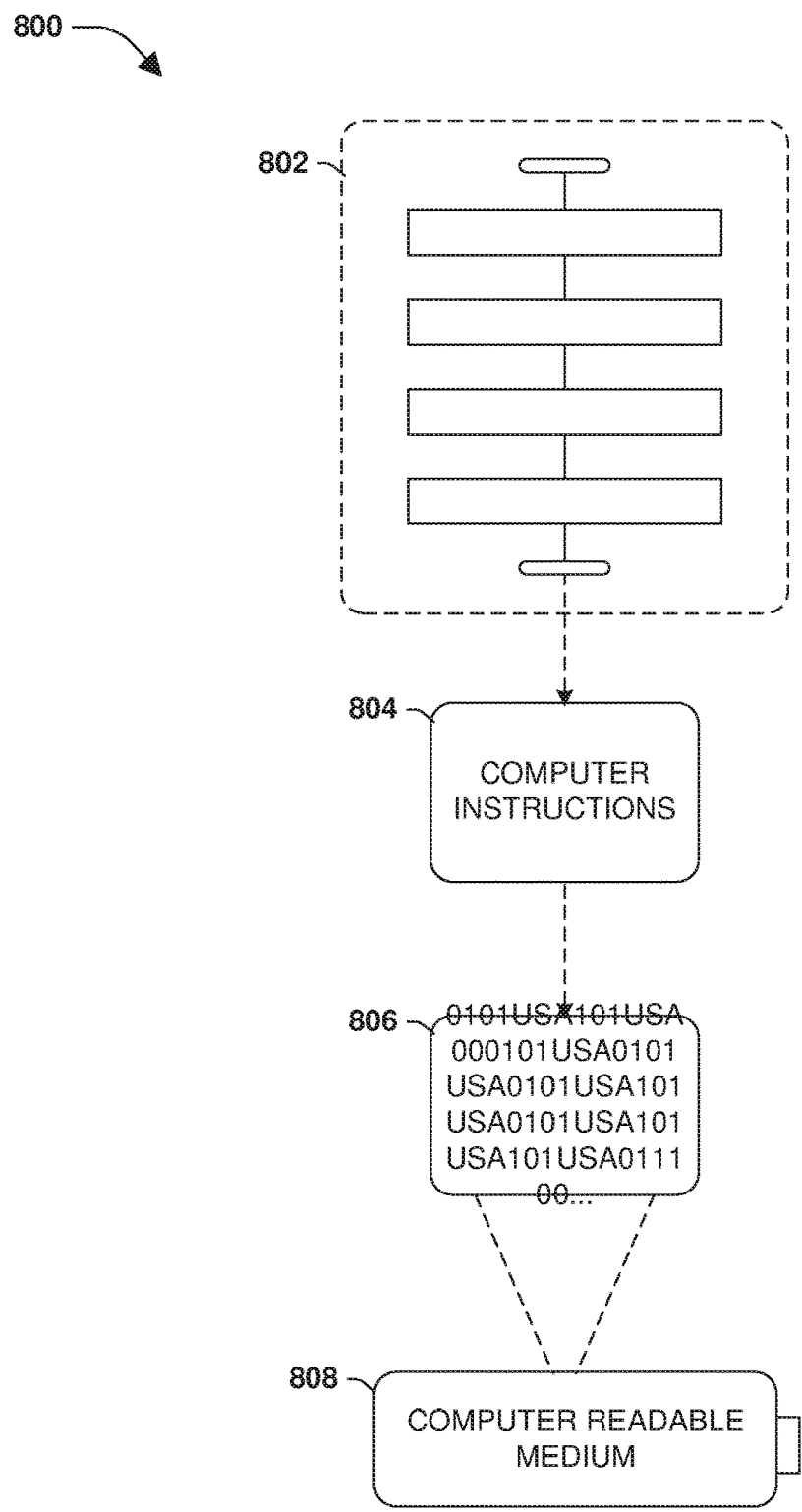
FIG. 8 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 8, wherein the implementation 800 comprises a computer-readable medium 808, such as a CD-ft DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the set of computer instructions 804 are configured to perform a method 802, such as at least some of the exemplary method 100 of FIG. 1, for example. In some embodiments, the set of computer instructions 804 are configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, at least some of the exemplary system 600 of FIG. 6, and/or at least some of the exemplary system 700 of FIG. 7, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
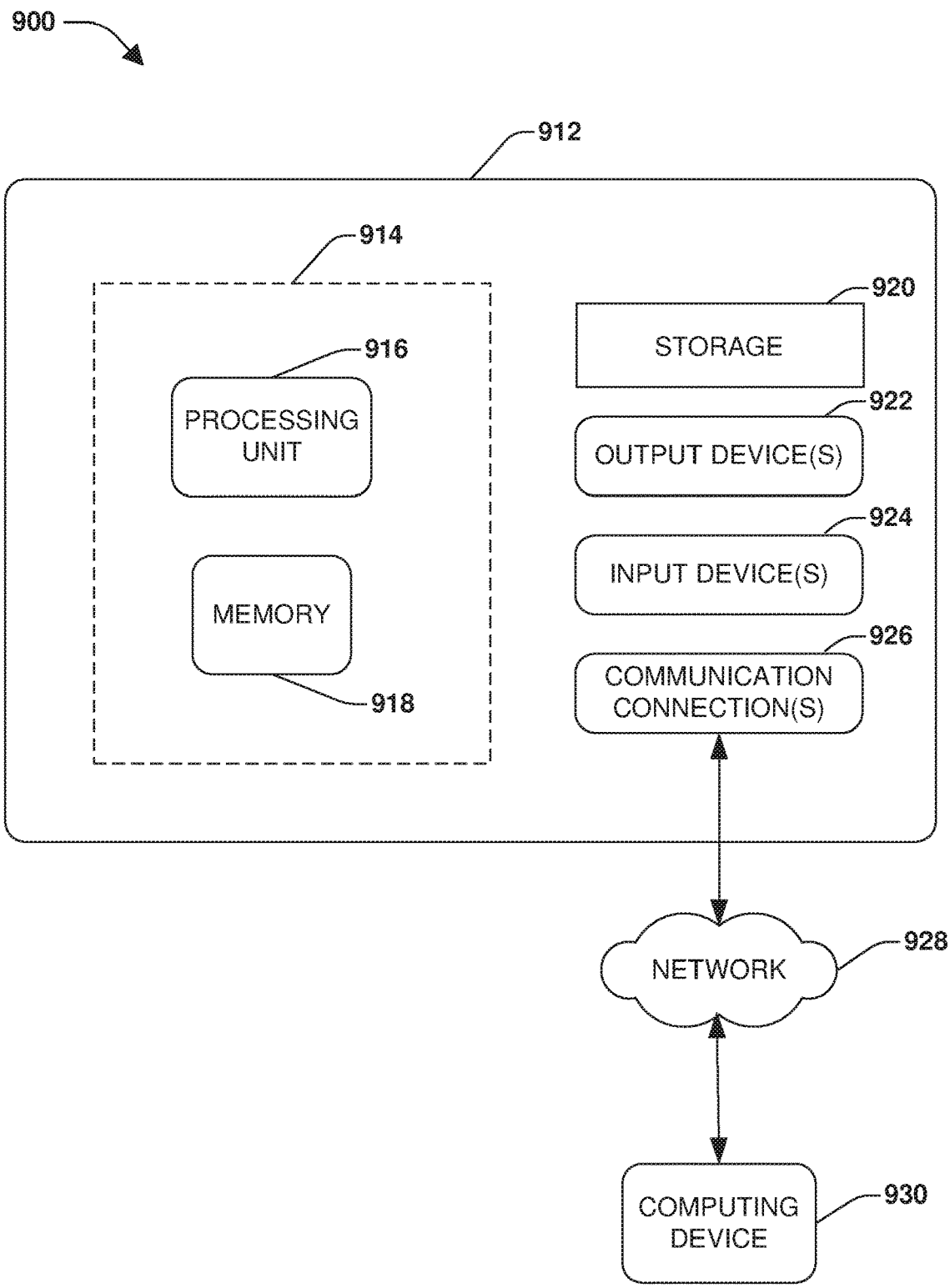
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Computer storage media does not, however, include propagated signals. Rather, computer storage media excludes propagated signals. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, implemented by a bid test component executing on a computing device by a processor using instructions stored in memory of the computing device, comprising:

creating a content scheme for a user with a content recommendation auction engine for recommending content of the user to users of a content provider service, wherein a keyword is inserted into a name of the content scheme to trigger the content recommendation auction engine to access and transmit a notification to an API of the bid test component;

receiving, by the bid test component over a network from the content recommendation auction engine through the API, the notification indicating that the keyword was inserted into the name of the content scheme to trigger the content recommendation auction engine to transmit the notification;

in response to determining that the keyword corresponds to a command keyword recognized by the bid test component, generating a number of test content schemes and assigning bid level values and portions of a budget as test budget values to each test content scheme;

calculating estimated budget utilization values for the test content schemes, wherein a first estimated budget utilization value corresponds to a first percentage of a first budget, assigned to a first test content scheme, that is to be utilized by a first point in time, and wherein a second estimated budget utilization value corresponds to a second percentage of a second budget, assigned to a second test content scheme, that is to be utilized by a second point in time; and transmitting, over the network by the bid test component, the test content schemes to the content recommendation auction engine that implements bidding on opportunities to recommend content to users of the content provider service based upon the test content schemes; and dynamically monitoring and adjusting the test content schemes over time based upon the estimated budget utilization values tracked over a timeframe.

2. The method of claim 1, comprising determining the number of test content schemes to create and the test budget values to assign to each test content scheme based upon a description of content, a user audience, and the budget specified by the notification.

3. The method of claim 1, comprising:

triggering, based upon the indicator, the content recommendation auction engine to accept instructions from the bid test component for implementing the test content schemes, wherein execution of the bid testing component by the computing device causes the bid testing component to transmit the instructions over the network to the content recommendation auction engine for remotely controlling how the content recommendation auction engine implements the test content schemes bidding on opportunities to recommend the content to the users.

4. The method of claim 1, comprising:

determining test content scheme statistic data, received over the network by the bid test component from the content recommendation auction engine, derived from bidding data of the test content schemes being implemented and user action data for the content.

5. The method of claim 4, comprising:
analyzing the test content scheme statistic data for ranking the bid level values assigned to the test content schemes.

6. The method of claim 5, comprising:
assigning a first rank to the first test content scheme based upon a first efficiency of the first test content scheme utilizing the first budget in relation to the first estimated budget utilization value.

7. The method of claim 6, comprising:
assigning a second rank to the second test content scheme based upon a second efficiency of the second test content scheme utilizing the second budget in relation to the second estimated budget utilization value.

8. The method of claim 5, comprising:
dynamically adjusting test budget values assigned to the test content schemes based upon the rankings.

9. The method of claim 7, comprising:
deactivating test content schemes having performance below a threshold based upon the rankings, wherein the first test content scheme is deactivated based upon the first rank being below a threshold and the second test content scheme is maintained based upon the second ranking not being below the threshold.

10. The method of claim 5, comprising:
providing a recommendation, specifying optimal performance bidding parameters, bidding timeframes, and bid level values to implement for the content scheme, based upon ranked bid level values.

11. The method of claim 1, comprising:
evaluating historic content scheme performance data to determine the number of test content schemes to create.

12. The method of claim 1, comprising:
evaluating historic content scheme performance data to determine the test budget values.

13. A computing device comprising:
a processor; and
memory comprising processor-executable instructions of a bid testing component that when executed by the processor cause the computing device to:
create a content scheme for a user with a content recommendation auction engine for recommending content of the user to users of a content provider service, wherein a keyword is inserted into a name of the content scheme to trigger the content recommendation auction engine to access and transmit a notification to an API of the bid test component;
receive, by the bid test component over a network from the content recommendation auction engine through the API, the notification indicating that the keyword was inserted into the name of the content scheme to trigger the content recommendation auction engine to transmit the notification;
in response to determining that the keyword corresponds to a command keyword recognized by the bid test component, generate a number of test content schemes and assigning bid level values and portions of a budget as test budget values to each test content scheme;
calculate estimated budget utilization values for the test content schemes, wherein a first estimated budget utilization value corresponds to a first percentage of a first budget, assigned to a first test content scheme, that is to be utilized by a first point in time, and wherein a second estimated budget utilization value corresponds to a second percentage of a second budget, assigned to a second test content scheme, that is to be utilized by a second point in time; and
transmit, over the network by the bid test component, the test content schemes to the content recommendation auction engine that implements bidding on opportunities to recommend content to users of the content provider service based upon the test content schemes; and
dynamically monitor and adjust the test content schemes over time based upon the estimated budget utilization values tracked over a timeframe.

14. The computing device of claim 13, wherein the processor-executable instructions of the bid testing component cause the computing device to:
determine the number of test content schemes to create and the test budget values to assign to each test content scheme based upon a description of content, a user audience, and the budget specified by the notification.

15. The computing device of claim 13, wherein the processor-executable instructions of the bid testing component cause the computing device to:
trigger, based upon the indicator, the content recommendation auction engine to accept instructions from the bid test component for implementing the test content schemes, wherein execution of the bid testing component by the computing device causes the bid testing component to transmit the instructions over the network to the content recommendation auction engine for remotely controlling how the content recommendation auction engine implements the test content schemes bidding on opportunities to recommend the content to the users.

16. The computing device of claim 13, wherein the processor-executable instructions of the bid testing component cause the computing device to:
determine test content scheme statistic data, received over the network by the bid test component from the content recommendation auction engine, derived from bidding data of the test content schemes being implemented and user action data for the content.

17. The computing device of claim 16, wherein the processor-executable instructions of the bid testing component cause the computing device to:
analyze the test content scheme statistic data for ranking the bid level values assigned to the test content schemes.

18. A non-transitory machine readable medium having stored thereon processor-executable instructions of a bid test component that when executed cause performance of operations, the operations comprising:
creating a content scheme for a user with a content recommendation auction engine for recommending content of the user to users of a content provider service, wherein a keyword is inserted into a name of the content scheme to trigger the content recommendation auction engine to access and transmit a notification to an API of the bid test component;
receiving, by the bid test component over a network from the content recommendation auction engine through the API, the notification indicating that the keyword was inserted into the name of the content scheme to trigger the content recommendation auction engine to transmit the notification;
in response to determining that the keyword corresponds to a command keyword recognized by the bid test component, generating a number of test content schemes and assigning bid level values and portions of a budget as test budget values to each test content scheme;

calculating estimated budget utilization values for the test content schemes, wherein a first estimated budget utilization value corresponds to a first percentage of a first budget, assigned to a first test content scheme, that is to be utilized by a first point in time, and wherein a second estimated budget utilization value corresponds to a second percentage of a second budget, assigned to a second test content scheme, that is to be utilized by a second point in time; and transmitting, over the network by the bid test component, the test content schemes to the content recommendation auction engine that implements bidding on opportunities to recommend content to users of the content provider service based upon the test content schemes; and dynamically monitoring and adjusting the test content schemes over time based upon the estimated budget utilization values tracked over a timeframe.

19. The non-transitory machine readable medium of claim 18, wherein the operations comprise:

adjusting a bid level value of a test content scheme based upon monitored content scheme statistic data for the test content scheme.

20. The non-transitory machine readable medium of claim 18, wherein the operations comprise:

adjusting a test budget value of a test content scheme based upon monitored content scheme statistic data for the test content scheme.

* * * * *